United States Patent [19]

Boys

[11] Patent Number: 4,881,022
[45] Date of Patent: Nov. 14, 1989

[54] METHOD AND/OR APPARATUS FOR CONTROLLING THE MOTOR SPEED OF AN ELECTRIC AC MOTOR AND/OR A METHOD OF DETERMINING TORQUE

[75] Inventor: John T. Boys, Auckland, New Zealand

[73] Assignee: University of Auckland, Auckland, New Zealand

[21] Appl. No.: 191,711

[22] Filed: May 10, 1988

Related U.S. Application Data

[63] Continuation of Ser. No. 841,763, Mar. 20, 1986, abandoned.

[30] Foreign Application Priority Data

Mar. 21, 1985 [NZ] New Zealand .................... 211523

[51] Int. Cl.⁴ .............................................. H02P 5/40
[52] U.S. Cl. ..................................... 318/800; 318/805
[58] Field of Search ......... 318/800, 803, 805, 807–812

[56] References Cited

U.S. PATENT DOCUMENTS 3,909,687  9/1975  Abbondanti .................... 318/805
3,989,991  11/1967  Brennen ......................... 318/805

Primary Examiner—David Smith, Jr.
Attorney, Agent, or Firm—Fleit, Jacobson, Cohn, Price, Holman & Stern

[57] ABSTRACT

A method and apparatus is shown to control both the motor terminal current to vary in exact proportion as the motor shaft torque varies for any given excitation frequency. This obviates the need for ancillary motor speed control and prevents voltage boosting at low speeds from resulting in excessive motor losses for no load conditions. A motor is powered from an inverter, the inverter providing an output voltage with independent control of amplitude and frequency. A frequency signal is fed directly to the inverter from a frequency input, the frequency input also being connected to a multiplier. The multiplier provides the amplitude signal for the inverter based on the product of the input frequency and motor current.

16 Claims, 1 Drawing Sheet

METHOD AND/OR APPARATUS FOR CONTROLLING THE MOTOR SPEED OF AN ELECTRIC AC MOTOR AND/OR A METHOD OF DETERMINING TORQUE

This is a continuation of application Ser. No. 841,763, filed Mar. 20, 1986 now abandoned.

BACKGROUND OF THE INVENTION

This invention relates to a method and/or apparatus for controlling the motor speed of an AC motor and/or a method of determining torque.

Squirrel cage induction motors are often desirable motors for industrial applications because of their low cost, ready availability, ruggedness and reliability. Until recently the speed of the motor has not been easily controllable but is determined by the number of poles, the mains supply frequency, and the motor loading. The motor loading causes small deviations in speed known as the motor slip.

Inverter drives for AC motors are now available at reasonable cost and allow the frequency of the voltage supplied to the motor to be varied over a wide range. The motor speed under no load conditions can be varied by adjusting the inverter output frequency, but small speed variations caused by changing motor loads are still present. To control the speed more accurately it is common practice to use a tacho-generator on the output shaft of the motor with a feedback control signal operating on the inverter output frequency.

Often it would be helpful to know what torque the motor is producing. Many techniques for doing this have been described but these usually involve controlling the flux in the motor's air-gap and then, operating with this constant flux, the torque can be determined. In many cases accurate shaft encoders must be used to determine the exact orientation of the motor's rotor so that the torque can be accurately calculated. Flux sensing and angle encoders are expensive and are not appropriate for a wide variety of applications.

To maintain constant air-gap flux, at full load, in a motor the motor voltage at low speeds must be increased, from the nominal constant volts/Hertz characteristic, to allow for the resistive losses in the stator winding of the machine. This voltage boosting is essential if rated torque is to be produced at low speeds, particularly at standstill, but it has the effect of increasing the motor losses under no load conditions. In a practical case the motor current in no-load conditions can be higher than the motor's full load current (at very low speeds) if the high voltage boost drives the motor into saturation. Thus if the voltage boost is high enough to give good starting performance it may well produce excessive motor losses on no load so that ultimately the motor will burn out even on no load. Summary of the Invention It is an object of the present invention to provide a method and/or apparatus for controlling the motor speed of an electric AC motor and/or a method of determining torque which will go at least some distance toward overcoming the foregoing disadvantages or which will at least provide the public with a useful choice.

Accordingly, in one aspect the invention consists in a method of controlling the motor speed of an electric AC motor comprising the steps of:

(a) supplying a voltage having a frequency characteristic following substantially the relationship $$|V_1| = k_1 \sqrt{M_r} \left( \omega + \frac{R_1 \omega_s}{R_2} \right)$$

where
$V_1$ = Terminal voltage
$M$ = Torque
$\omega$ = supply frequency
$\omega_s$ = rated slip
to said motor,
(b) measuring the motor current,
(c) multiplying the measured current signal and the supplied voltage, and
(d) using the signal so formed to control the amplitude of the voltage supplied to the motor.

In a further aspect the invention consists in apparatus for controlling the motor speed of an AC electric motor comprising a current measuring means, a voltage source, multiplier means to multiply the sensed current, and voltage motor drive means, the output of said motor drive means comprising a voltage having a frequency characteristic following substantially the relationship $$|V_1| = k_1 \sqrt{M_r} \left( \omega + \frac{R_1 \omega_s}{R_2} \right)$$

and having the output therefrom to the motor generated by the output from said multiplier means.

In a still further aspect the invention consists in a method of determining torque comprising the steps of adjusting an AC motor terminal voltage and current until the p.u. voltage and p.u. current at that frequency are equal, measuring the p.u. voltage or current and squaring the read voltage or current to give the motor torque.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE INVENTION

One preferred form of the invention will now be described with reference to the accompanying drawings in which, FIG. 1 is a per-phase equivalent circuit of an induction machine, FIG. 2 is a schematic drawing of a motor driving an inertial load, FIG. 3 is a schematic diagram of a practical speed controller for an induction motor according to the present invention, FIG. 4 is a plot of the required voltage/frequency characteristic for the motor.

DETAILED DESCRIPTION OF THE INVENTION

In this specification the units p.u. used refer to proportions of the rated value of that unit.

Figure 1:
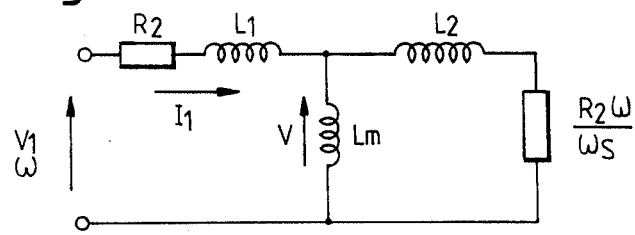

Considering the terminal voltage and current of a squirrel-cage induction motor producing torque M but constrained to operate with constant slip-frequency $\omega_s$. Then using the per-phase equivalent circuit shown in FIG. 1 the torque M is given by the well known expression:

$$M = \frac{3pV^2 R_2/\omega_s}{\omega^2 L_2^2 + \frac{R_2^2 \omega^2}{\omega_s^2}} \tag{1}$$

where p=the number of pole pairs in the machine and the other symbols are as shown in FIG. 1. Note that the machine has been assumed to be three phase, but this purely for convenience as the technique is applicable to motors with any number of phases.

Re-arranging equation (1) leaves $$V = \omega \sqrt{M} \sqrt{\frac{1}{3p}\left(\frac{R_2}{\omega_s} + \frac{\omega_s L_2^2}{R_2}\right)} \tag{2}$$

$$= K_1 \omega \sqrt{M} \text{ say since } \omega_s \text{ is constant} \tag{3}$$

The input current $I_1$ is given by $$I_1 = \frac{V}{j\omega L_m} + \frac{V}{\frac{R_2 \omega}{\omega_s} + j\omega L_2} \tag{4}$$

$$\simeq \frac{-jV}{\omega L_m} + \frac{V\left(\frac{R_2 \omega}{\omega_s} - j\omega L_2\right)}{\left(\frac{R_2 \omega}{\omega_s}\right)^2} \tag{5}$$

since $\left(\frac{R_2 \omega}{\omega_s}\right)^2 \gg \omega^2 L_2^2$.

Thus $$V_1 = V + (R_1 + j\omega L_1) \cdot \left[\frac{\omega_s}{R_2 \omega} - \frac{s}{\omega L_m} - \frac{j\omega L_2}{\left(\frac{R_2 \omega}{\omega_s}\right)^2}\right] \tag{6}$$

$$= V\left\{1 + \frac{R_1 \omega_s}{R_2 \omega} + \frac{L_1}{L_m} + \frac{\omega_s^2 L_1 L_2}{R_2^2} + j\left[\frac{\omega_s L_1}{R_2} - \frac{R_1}{\omega L_m} - \frac{\omega_s^2 L_2 R_1}{R_2^2 \omega}\right]\right\} \tag{7}$$

With typical machine parameters and noting that operation is at constant slip so that the minimum possible value for $\omega$ is $\omega_s$ the magnitude of $V_1$ may be approximated within 1-2% by $$|V_1| \simeq V\left[1 + \frac{R_1 \omega_s}{R_2 \omega}\right] \tag{8}$$

while the magnitude of the terminal current $I_1$ is, from equation (5)

$$|I_1| = \frac{V}{\omega}\sqrt{\frac{\omega_s^2}{R_2^2} + \left(\frac{1}{L_m} + \frac{\omega_s^2 L_2}{R_2^2}\right)^2} \tag{9}$$

At any frequency $\omega$ with rated slip $\omega_s$ and torque M the terminal voltage and current are therefore $$V_1 = k_1 \sqrt{M}\left(\omega + \frac{R_1 \omega_s}{R_2}\right) \tag{10}$$

$$|I_1| = k_1 \sqrt{M}\sqrt{\frac{\omega_s^2}{R_2^2} + \left(\frac{1}{L_m} + \frac{\omega_s^2 + L_2^2}{R_2^2}\right)^2} \tag{11}$$

We define the 1 p.u. value of $|I_1|$ (i.e. the rated machine current) to be given by equation (11) when rated torque occurs with rated slip independent of the frequency. The 1 p.u. value of $|V_1|$ we take to be frequency dependent at rated torque according to the expression $$|V_1| = k_1 \sqrt{M_r}\left(\omega + \frac{R_1 \omega_s}{R_2}\right) \tag{12}$$

where $M_r$ is the rated machine torque. Then, in the general case at frequency $\omega$ with torque M we have $$V_1 = \sqrt{\frac{M}{M_r}} \; p.u.$$

$$I_1 = \sqrt{\frac{M}{M_r}} \; p.u.$$

Also from equation (3) the air gap voltage in the machine V varies with frequency and the load torque. Thus the machine's air-gap flux, which is proportional to $V/\omega$, is exactly proportional to the square root of the load torque for this control strategy. In per unit terms, therefore the machine flux is also $\sqrt{M/M_r}$ pu. In practice however the flux cannot be simply determined so that a controller based on voltage measurements is a more practical device especially considering that the 1 pu voltage expression is from equation (12) a linear function of the frequency.

Under constant slip-frequency conditions therefore both the voltage and the current magnitudes (measured at the machine terminals) vary in exact proportion as the shaft torque varies for any given excitation frequency—this is in sharp contrast to the more usual mode of operation of an induction motor where the voltage is held constant and the torque increases as the current increases for the usual range of operating slip frequencies.

A torque and speed control strategy is therefore to adjust the terminal voltage until the p.u. voltage (at that frequency) and the p.u. current are equal. At this precise point the p.u. torque is then given by the square of the p.u. voltage (or current) while the slip frequency is the rated value for the machine so that the shaft speed is known directly from a knowledge of the inverter frequency.

Since the air-gap voltage V, which cannot be directly measured, and the terminal voltage $V_1$ are directly related by equation 8 the operating point can also be expressed as the per unit air-gap voltage and the per unit current are equal. But as the air gap voltage is directly proportional to the machine flux, the desired operating point corresponds exactly to the condition that the per flux and the per unit current should be equal. Furthermore for a given torque M the airgap voltage V (in volts) is from equation 3 directly proportional to $\omega$ so that the machine flux is not frequency dependent at all as voltage and flux are also linearly frequency related. Thus this controller seeks to maintain the utilization of the magnetic circuit for the machine, as measured by the per unit flux, and the utilization of the copper circuit of the machine, as measured by the per current, equal. This is in sharp contrast to all other known controllers—for example Abbondanti U.S. Pat. No. 3,909,687 where the primary object is to maintain the flux constant. Here the flux is allowed to vary over a wide range as the operating conditions for the motor change.

The Motor Transfer Function

Figure 2:
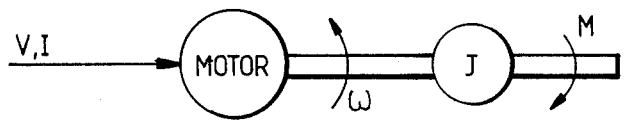
Figure 3:
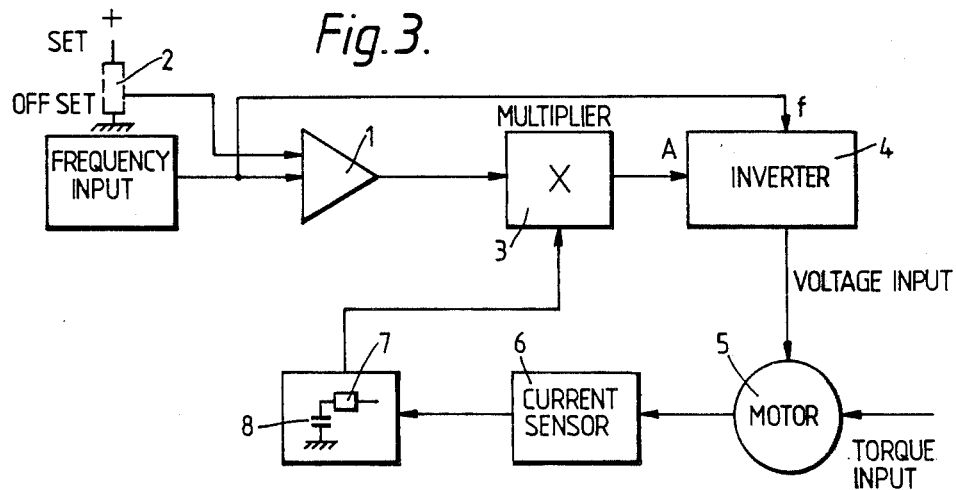

Considering a motor with the terminal voltage at frequency $\omega$ with p.u. constant I and p.u. voltage V driving an inertial load J, with friction or work moment M as shown in FIG. 2. The steady state operating point is assumed to be with $V_{pu}=I_{pu}$ as required by the control algorithm. A technique for generating the $V_{pu}$ voltage required here is shown in FIG. 3 and is described below, but for the moment the method of voltage generation is not considered as we are simply concerned with the effects of small changes in voltage and load torque, about the operating point. Thus FIG. 2 shows the mechanical circuit for the motor in the same way as FIG. 1 shows the equivalent electrical circuit. At the operating point there must be a torque balance between the motor torque, the accelerating inertia, and the restraining torque.

$$\therefore VI = J\frac{d\omega}{dt} + M \quad (14)$$

The steady-state condition is given by $$VI = M \quad (15)$$

For small variations about the steady state operating point we may differentiate equation (14) to leave $$V\delta I + I\delta V = J \cdot \frac{d}{dt}(\delta\omega) + \delta M \quad (16)$$

Also for small deviations $$\delta I = \frac{\partial I}{\partial \omega} \cdot \delta\omega + \frac{\partial I}{\partial V} \cdot \delta V \quad (17)$$

Now $$\frac{\partial I}{\partial \omega}$$

is the rate of change of I with $\omega$ if the terminal voltage remains constant. For our purposes involving small variations about the operating point at constant slip frequency $$\frac{\partial I}{\partial \omega} = -\frac{KI}{\omega_s}$$

where $\omega_s$ is the slip frequency and k varies as $\omega_o$ varies. Typically for $\omega_o \sim$ rated frequency $k \sim 0.8$, while for $\omega_o \sim \omega_s$ $k \sim 0.3$. Similarly $$\frac{\partial I}{\partial V}$$

is the reciprocal of the machine impedance at the operation point $$= \frac{I}{V} = \frac{1}{Z}$$

say. Thus equation (17) reduces to $$\delta I = -\frac{KI}{\omega_s}\delta\omega + \frac{\delta V}{Z} \quad (18)$$

Eliminating $\delta\omega$ between equations (16) and (18) and using the Laplace operator s for (d/dt) yields $$\frac{\delta I}{I} + \frac{\delta V}{V} = \frac{J\omega_s S}{VIk}\left(-\frac{\delta I}{I} + \frac{\delta V}{V}\right) + \frac{\delta M}{VI} \quad (19)$$

Noting equation (15), defining $$T \triangleq \frac{J\omega_s}{KM},$$

and using i, v, m for $\delta I$, $\delta V$, $\delta M$ leaves $$\frac{i}{I} = \frac{v}{V}\left[-\frac{1+\delta T}{1+\delta T}\right] + \frac{m}{M(1+ST)} \quad (21)$$

Thus a control algorithm adjusting V so that I and V are equal (note that these are both in pu quantities) has a stability problem caused by the presence of a zero in the right half plane at $s = +1/T$. This zero does not make control impossible but means that stable control systems will be relatively slow in response. This machine time constant T varies widely as M, ", and k vary for different operating steady state conditions. Equation (21) is the required transfer function and describes how small changes in the current, voltage, and torque are related.

A Practical Controller

A schematic diagram for a controller to operate a motor with $V_{pu}=I_{pu}$ is shown in FIG. 3. It comprises: a frequency input device, a 1 p.u. voltage (which varies with frequency) calculation circuit, an electronic multiplier, an inverter with independent amplitude and frequency controls, an induction motor with a current sensor and a current filter. The inverter simply performs the function of a high power amplifier and is assumed to have no effect on the p.u. values of the signals it passes. The inputs to the electronic multiplier are the 1 p.u. voltage according to equation (12) and the filtered signal representing the p.u. motor current.

The operation of the circuit of FIG. 3 is as follows. The frequency input signal is an inverter and motor are to operate at—for example, it may be scaled 0-10 volts to correspond to 0 to 100 Hz or whatever other range the designer chooses. This "frequency input" voltage may come from some other controller, or it may come from a potentiometer which can be adjusted by an operator. In principle changes in it correspond to desired changes in the motor speed which changes are affected by changes in the inverter operating frequency.

Figure 4:
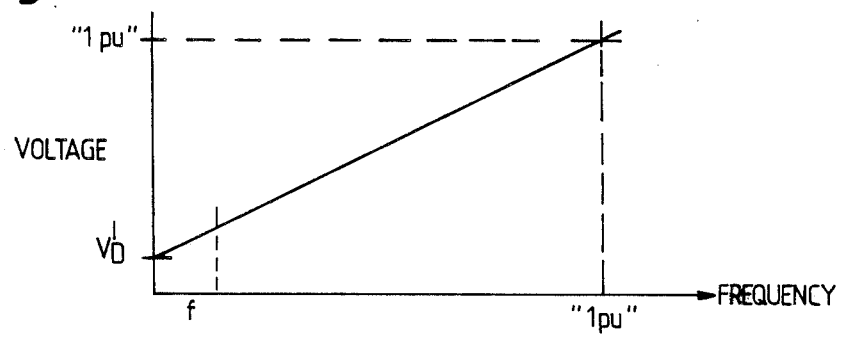

The required 1 pu voltage equation for the inverter is given by equation 12 as linearly dependent on the operating frequency shown in equation 12 as ω. This 1 pu voltage expression is easily generated by an adder 1 in FIG. 3 which adds a set offset from potentiometer 2 to the voltage representative of the frequency input. The output of adder 1 is a voltage representative of the 1 pu voltage required for the particular induction motor being used. As the frequency input varies the 1 pu voltage will also vary but it will maintain the correct relationship between the voltage and frequency shown in FIG. 4. At zero frequency the motor voltage required $V^1D$ corresponds to the set-offset potentiometer 2. At the nameplate rated frequency the voltage required corresponds to the nameplate rated voltage. Conventionally these nameplate voltages and frequencies are referred to as the "1 pu" voltage and frequency but in our notation the 1 pu voltage depends on the actual frequency as shown and is not simply the nameplate voltage for the machine. Thus in our notation a 460 volt 60 Hz motor will have a 1 pu voltage equivalent to 460 volts at 60 Hz but at 30 Hz the 1 pu voltage will correspond to slightly more than 230 volts.

Inverter 4 is a high power amplifier capable of producing high power output voltages at a frequency dependent on the input labelled f and an amplitude dependent on the input labelled A. Preferably this high power amplifier would be a PWM inverter, made by a variety of well-known methods, with independent control of both amplitude and frequency. In a typical embodiment the f input may be scaled to give 0–100 Hz output waveforms for a 0–10 volt input signal while the A input may be scaled to give 0–500 volts for a 0–10 volt input at A. Thus by choosing different voltages for A and f any desired voltage at any desired frequency can be obtained. The PWM inverter would preferably be a three phase inverter suitable for use with three phase induction motors but other configurations are possible.

The output frequency of inverter 4 is directly determined by the voltage corresponding to the frequency input as shown. The amplitude for the output waveforms from inverter 4 is determined by the output of multiplier 3 at the A input. The current flowing in motor 5 is measured by current sensor 6 which outputs a D.C. signal representative of the magnitude of the motor current.

The current sensor 6 may be any one of a variety of current sensors well known to motor controller designers—for example it may use Hall-effect devices to measure the three phase alternating currents and then rectify these measured signals with a diode bridge to give a signal representative of the motor current amplitude.

This current signal is smoothed by a low pass filter comprising resistor 7 and capacitor 8 to give the other input to multiplier 3. Thus the two inputs to multiplier 3 are from adder 1 a signal representative of the 1 pu voltage for that particular frequency, and from low pass filter 7, and 8 the measured current in the motor. Simple scaling of the current signal allows full rated current to correspond to a signal of 10 volts. With this scaling 0–10 volts is then equivalent to 0–1 pu current.

The output from multiplier 3 is thus the 1 pu voltage multiplied by the pu current and is a signal representative of the voltage required for the motor. With this circuitry the motor voltage in per-unit terms is forced to be equal to the smoothed measured per unit current so that the steady state operation of the circuit must correspond to the point where the per unit voltage and current are equal as required for this method of control. At this point therefore the motor slip frequency is constant and all the other advantages of the technique obtain. At low frequencies and low currents the motor voltage (measured in volts) will be very small, but at high frequencies and high currents it will be much larger.

Motor 5 will be connected to some mechanical load which will require a torque to drive it. As the load torque changes the motor current will change so that the mechanical load is essentially a variable input torque device to the controller of FIG. 3. An increase in the load torque will cause an increase in the motor current detected by current sensor 6. This increase after being smoothed by filter 7 and 8 causes an increase in the input to multiplier 3 so that the output of multiplier 3 for the same frequency input giving the same 1 pu voltage from adder 1 increases. This output is the amplitude input A to inverter 4 so that the output voltage of inverter 4 increases producing a higher voltage input to motor 5 to drive the increased load. On a reduction in load a similar process takes place and the motor voltage is reduced.

In our embodiment resistor-capacitor combination 7 and 8 have a time constant of 0.1 seconds (R = 1000 Ω, c = 10 μF) and we have found this to give stable operation over the full speed range.

Working completely in small changes to the steady-state I,V,M. quantities the response of this system to a change in torque can now be determined. This circuit multiplies the 1 p.u. voltage by the filtered p.u. current so that it converges to the point where the p.u. voltage equals the p.u. current on a steady-state basis—as required for the algorithm. The small signal transfer function for the motor is given by equation (21) while the current sensor and filter have a transfer function $$\frac{v}{V} = \frac{i/I}{(1 + s\tau)} \quad (22)$$

where τ is the resistor capacitor time constant of the low pass filter 7 and 8. Combining these two equations leads to the small signal transfer function for the motor and controller given by:

$$\frac{v}{V} = \frac{m/M}{2 + s\tau + s^2\tau T} \quad (23)$$

where T is the motor load time constant given by equation 20.

This simple response is unconditionally stable and allows the control algorithm to be used. It should be noted that other current filter characteristics can be used to obtain different transient behaviour.

The steps of implementing this form of control are therefor:

(i) use an inverter with independent voltage and frequency control of its output terminals.
(ii) arrange for a 1 p.u. voltage/frequency characteristic to follow the relationship given by equation (12)

$$|V_1| = k_1 \sqrt{M_r} \left( \omega + \frac{R_1 \omega_s}{R_2} \right)$$

[Note that this is a linear function as shown in FIG. 2, so that its generation is particularly simple].
(iii) measure the pu motor current and filter it.
(iv) multiply the generated 1 p.u. voltage by the filtered current signal and use this modified signal to generate the motor voltages in the inverter.

The required voltage boost $V_b$ is given be $$V_b = k_1 \sqrt{M_r} \cdot \frac{R_1 \omega_s}{R_2}$$

which is inconvenient to calculate as $k_1$, $R_1$, and $R_2$ are difficult to determine. A simple setting up procedure is however possible involving the steps of
(i) setting the frequency to $f_{slip}$.
(ii) holding the motor shaft stationary.
(iii) adjusting the value $V_b$ until the motor has rated current flowing in it.

In this way none of the specific motor parameters need be determined at all yet the performance obtained is excellent—note that the rated current and slip frequency are usually available on the motor's nameplate.

Thus it can be seen that at least in the preferred form of the invention an apparatus and method is described whereby the motor speed can be held essentially constant, as the motor torque varies over a wide range (from 0.05 to 1.0 p.u.) without the need for a tachogenerator. Also the motor torque can be determined in a simple fashion at any time while the motor speed is being so controlled. Motor losses are able to be significantly reduced at times when high voltage boost is not necessary and thus at any speed including stall or starting conditions the motor voltage is effectively varied dynamically in such a way that the speed is controlled, and the torque can be determined, yet the motor losses are only as high as those necessary to drive the connected load. The technique described in this invention is applicable to situations where the drive operation is essentially steady state or continuous such as pumps, fans and blowers, machine tools, and conveyors. It is not effective with pulsating tools where the pulsations occur in less than typically 0.5 seconds. Apart from this restraint the invention is applicable to all types of inverter, converter, and cycloconverter drive to give improved efficiency, lower motor losses, speed control, and torque measurement, over a wide range of operating conditions, with no external flux, speed or other transducers.

What we claim is:

1. A method of controlling the motor speed of an electric AC motor comprising the steps of:
   (a) generating a voltage having a frequency characteristic following substantially the relationship $$|V_1| = k_1 \sqrt{M_r} \left( \omega + \frac{R_1 \omega_s}{R_2} \right)$$

where
$V_1$ = generated voltage,
$M_r$ = rated Torque of the motor, and
$\omega$ = supply frequency, $\omega_s$ = rated slip
   (b) measuring the motor current in per unit terms,
   (c) multiplying said measured motor current signal and the said generated voltage, and
   (d) supplying the voltage so formed as the terminal voltage supplied to the motor.

2. A method of controlling the motor speed of an electric AC motor as claimed in claim 1 wherein the voltage supplied to the motor is generated from a 1 p.u. voltage characteristic.

3. A method of controlling the motor speed of an AC motor as claimed in claim 1 wherein said motor current is filtered.

4. A method of controlling the motor speed of an AC motor as claimed in claim 3 wherein said filter has a single pole transfer function of the form $1/(1+S\tau)$.

5. A method of controlling the motor speed of an AC motor as claimed in claim 1 wherein said voltage supplied to the motor is supplied through an inverter converter or cycloconverter.

6. A method of controlling the motor speed of an AC motor as claimed in claim 1 wherein said step of measuring the current comprises the step of indirectly sensing said current.

7. A method of determining torque comprising the steps of adjusting the AC motor terminal voltage and current until the p.u. voltage and p.u. current at that frequency are equal, measuring the p.u. voltage or current and squaring the read voltage or current to give the motor torque.

8. Apparatus for controlling the speed of an AC induction motor comprising voltage generator means having a voltage frequency characteristic substantially following the relationship $$|V_1| = k_1 \sqrt{M_r} \left( \omega + \frac{R_1 \omega_s}{R_2} \right)$$

where
$V_1$ = generated voltage,
$M_r$ = rated torque of the motor,
$\omega$ = supply frequency and
$\omega_s$ = rated slip,
current measuring means to measure the motor current, multiplier means to multiply the sensed current in per unit terms turns with the output from the said voltage generator means, and motor drive means for supplying the voltage formed at the output of the multiplier to the terminals of the motor.

9. Apparatus for controlling the speed of an AC induction motor comprising means for controlling the flux in the motor, means for determining the current in the motor and control means for adjusting the said flux until the p.u. current and the p.u. flux are equal.

10. Apparatus for controlling the speed of an AC induction motor as claimed in claim 9 wherein said means for controlling said flux in the machine comprises means for applying a controlled voltage to the terminals of the machine.

11. Apparatus for controlling the speed of an AC induction motor as in claim 10 wherein said control means adjusts the said terminal voltage until the p.u. voltage and the p.u. current are equal.

12. Apparatus as claimed in claim 8 wherein said motor drive means comprises an inverter.

13. Apparatus as claimed in claim 8 wherein a current filter is provided to filter current measured by said current measuring means.

14. Apparatus as claimed in claim 13 wherein said filter has a transfer function of $1/(1+S\tau)$.

15. Apparatus as claimed in claim 8 wherein said current measuring means comprises a current sensor.

16. An apparatus for controlling the speed of an induction motor, said apparatus comprising:
   (a) input means for inputting a speed signal representative of an excitation frequency at which an induction motor is to be excited;
   (b) function generator means for generating a rated voltage amplitude signal as a fixed function of said speed signal, said rated voltage amplitude signal corresponding to a magnitude of a voltage by which said motor must be excited to produce a rated torque at a rated current for said motor at said excitation frequency;
   (c) current sensing means for measuring the magnitude of the current drawn by said motor as a fraction of said rated current for said motor;
   (d) low pass filter means for filtering said measured current to give a filtered fractional current magnitude;
   (e) multiplier means for multiplying said filtered fractional current magnitude by said rated voltage amplitude signal to produce a required voltage amplitude signal; and
   (f) inverter means responsive to said required voltage amplitude signal and to said speed signal, for producing power to drive said induction motor at a frequency corresponding to said speed signal with a voltage given by said required voltage amplitude signal.

* * * * *